June 23, 1959   J. HERRMANN   2,891,653
LOADING DEVICE
Filed Nov. 12, 1954
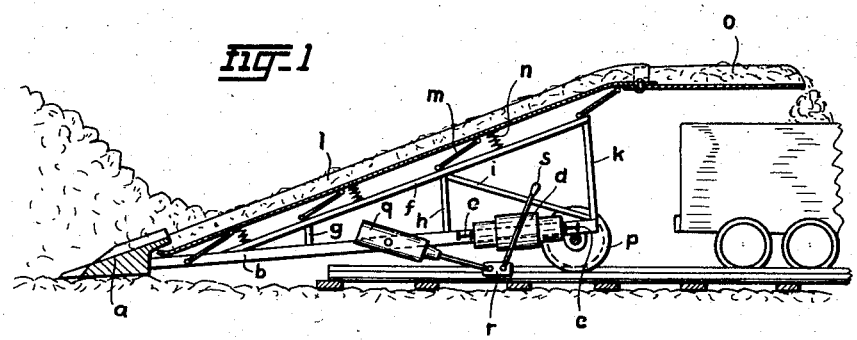
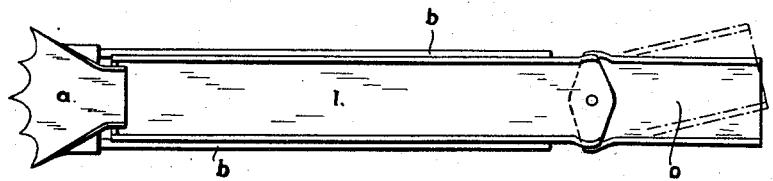
INVENTOR
JULIUS HERRMANN
BY
Burgess and Dinklage
ATTORNEYS United States Patent Office 2,891,653
Patented June 23, 1959

2,891,653
LOADING DEVICE

Julius Herrmann, Westphalia, Germany, assignor to Gewerkschaft Eisenhutte Westfalia, Wethmar, near Lunen, Germany, a corporation of Germany Application November 12, 1954, Serial No. 468,493

Claims priority, application Germany November 13, 1953

5 Claims. (Cl. 198—14)

This invention relates to an improved loading device. The invention more particularly relates to an improved combination oscillating shovel loader and oscillating conveyor.

Oscillating shovel loaders have an oscillating generator connected thereto for imparting the same with linear oscillations of a relatively high frequency of, for example, 180–1500 vibrations per minute of a small amplitude, as, for example, about 5–100 mm. Such a generator can be of any known or conventional construction, for example as described in the specification of the German Patent 810,678.

The device may be used for the loading of divided material, such as coal or the like. The loading shovel is urged against the base of a pile of the divided material, and the oscillation drive forces the same into and beneath the pile of material, while conveying the material to be loaded along the shovel in a horizontal or upwardly inclined direction.

In view of the high frequencies and the inertia forces which occur, it is not practical to construct the loaders with economical and durable drives, which will impart oscillations capable of conveying the materials in a horizontal or upwardly inclined path. Due to practical considerations the drives which could be used were generally limited to drives which produce a reciprocating motion of pure or approximately sinusoidal form or drives which impart a form of motion which is identical in the forward and rearward directions.

One object of the invention is an oscillating combination shovel loader and conveyor having the above-described drive type and which effects a dependable loading and conveying of the material.

This, and still further objects become apparent from the following description, read in conjunction with the drawings, in which:

Fig. 1 is a side elevation of an embodiment of a combination oscillating shovel loader and conveyor in accordance with the invention; and Fig. 2 is a plan view of the loader shown in Fig. 1.

The loading device in accordance with the invention has a base member, as, for example, in the form of a triangular or wedge-shaped frame. A loading shovel is connected to the forward end of the base member. Means for imparting linear oscillations to the base member and the loading shovel, as for example, a conventional oscillating generator, is connected to the base member. An inclined conveyor is positioned above the base member behind the loading shovel. The inclined conveyor, as, for example, in the form of conveyor trough, defines an upwardly inclined path of travel for material from the shovel. The conveyor is connected to the base member by means of inclined pivot arms and springs, so that when the base member with the loading shovel are imparted linear oscillations, the conveyor will swing in a direction, which causes a movement of the material rearwardly in an upward direction.

Referring to the embodiment shown in the drawing, the base member consists of two strong rods or beams $b$, which are connected to each other by cross arms $c$. Connected to the beams $b$ are the vertical frames $g$, $h$ and $k$, the upwardly inclined frame member $f$ and the cross-supporting member $i$. The entire base member is thus in the form of a wedge-shaped frame. The base member is mounted at its rearward end on the rail wheels $p$, which move along a rail track. A loading shovel $a$ is rigidly connected to the forward end of the base member. An air piston cylinder arrangement $q$ is pivotally connected to the beam $b$ of the base member. A clamp $r$ is connected to the piston of the piston cylinder arrangement $q$ by means of a piston rod. The clamp $r$ may be attached to the rails along which the wheels $p$ run by means of the lever handle $s$. By charging air to one side of the piston in the piston cylinder arrangement $q$, the base member is urged forward resiliently forcing the loading shovel $a$ into the pile of material to be loaded. By charging the other side of the piston cylinder arrangement, the shovel may be withdrawn.

Between the cross beams $c$ of the base member an oscillating motor $d$ is positioned. This oscillating motor may be of any conventional construction and is, for example, a compressed air motor which consists solely of a cylinder and a piston which may reciprocate back and forth in the same. The piston is a step piston having a central cylindrical portion of the greatest diameter and cylindrical portions on each side of smaller diameter. The cylinder has a central portion in which the central portion of the piston may reciprocate and two opposed cylinder heads into which the smaller diameter portions of the piston will travel, forming an air buffer or cushion for the heavy piston upon movement in the opposite directions. The piston effects oppositely directed oscillatory motion with respect to the cylinder and all of the rigid parts connected with the cylinder. The movement is similar to a sinusoidal longitudinal oscillation. Since the shovel $a$ is rigidly connected with the oscillating motor $d$, the shovel is impelled into the pile of divided material to be loaded, such as the coal or ore, and withdrawn from it at a uniform rate. The oscillating motor may, for example, impart linear oscillations to the base and loading shovel, of, for example, a frequency of 180–1500 vibrations per minute and an amplitude of 5 to 100 mm.

A conveyor is positioned above the base member behind the loading shovel $a$. The conveyor consists of a conveyor trough $l$ and a discharge tray $o$. The conveyor trough $l$ is resiliently supported above the base member by means of pivot arms $m$ and coil springs $n$. The pivot arms $m$ are pivotally connected at one end to the base member, and at the other end to the conveyor trough and are inclined toward the discharge tray $o$. Due to the pivotal connection, a longitudinal force on the shovel $a$ in a direction toward the pile of the divided material will tend to compress the springs $n$ and force the trough $l$ in a vertical direction toward the frame, whereas release of this compression by force in the opposite direction will tend to raise the trough vertically upwardly above the base member. The discharge tray $o$ of the conveyor is pivotally connected to the conveyor trough, so that the same may be swung in a horizontal plane with respect to the trough. The lower end of the conveyor trough extends below a suitably dimensioned portion at the discharge end of the loading shovel $a$.

In operation, the device is moved along the rails by means of the rail wheels $p$. The forward end with the shovel loader may either slide along the floor or be lifted for the purpose of transportation. The device is position adjacent to a pile of divided material, such as coal or ore, and the forward end of the loading shovel $a$ is positioned against the base. The clamp $r$ is clamped to the rail by means of a lever s, and the forward side of the cylinder of the piston cylinder arrangement q is charged with fluid, such as compressed air, so that the entire device is resiliently urged forward, urging the loading shovel a into the base of the pile of material. A railroad car or the like is in position beneath the discharge chute or pan o of the conveyor.

The oscillating motor d is then started in operation imparting linear oscillations to the base member b and loading shovel a, forcing the shovel under and into the pile of divided material. As the device is moved forward into the pile of ore, the pivot arms m force the conveyor trough l toward the base member, compressing the springs n. In this connection, the conveyor trough l is also pulled away below the material, which is supported on it, so that the material may effect a dropping motion in a vertical plane. On the reverse stroke of the loading shovel, when the same moves outward and away from the pile of material, the conveyor, due to the pivot arms m, moves upwardly, sided by the springs n. The conveyor thus effects a vertical oscillating motion, and the divided material, such as the coal, is moved upwardly along the conveyor in the conveyor trough, and passes by means of the discharge pan o into the rail car for removal. If it is desired to remove the device from the pile of coal, the cylinder piston arrangement q may be charged on the other side of the piston, thus withdrawing the device.

While the invention has been described in detail with reference to the embodiment shown, various other embodiments and modifications will become apparent to the skilled artisan which fall within the spirit of the invention and the scope of the appended claims.

I claim:

1. Loading device comprising a base member, a loading shovel connected to the forward end of said base member, means for imparting linear oscillations to said base member and loading shovel, an inclined conveyor positioned above said base member behind said loading shovel defining an upwardly inclined path of travel for material from said shovel, spring means and inclined pivot arm means resiliently supporting said conveyor above said base member, whereby when said base member is urged forward by said oscillations to move said loading shovel into a pile of said material to be loaded, the said pivot arms force the said conveyor in a vertical direction downward toward the said base member compressing the said springs whereby the said material on said shovel is caused to drop onto said conveyor and when said base member is moved outwardly and away from the pile of said material, the said conveyor due to the said pivot arms and said springs moves in a vertical direction upwardly from the said base member causing the said material supported thereon to be moved upwardly along the said conveyor.

2. Loading device according to claim 1, in which said inclined pivot arm means are downwardly inclined in the direction of said discharge tray.

3. Loading device according to claim 2, in which said base member is in the form of a wedge-shaped frame.

4. Loading device according to claim 1, including means for resiliently urging said base member forward.

5. Loading device according to claim 4, in which said means for resiliently urging said base member forward include a cylinder pivotally connected to said base member, and a piston positioned in said cylinder, a piston rod connected to said piston and extending from said cylinder, clamp means connected to said piston rod, and means for charging fluid under pressure to at least one side of said piston in said cylinder.

References Cited in the file of this patent
UNITED STATES PATENTS 2,630,211    Carrier et al.            Mar. 3, 1953

FOREIGN PATENTS 305,215      Germany              Mar. 17, 1914
496,920      Belgium               July 31, 1950
888,526      Germany              Sept. 3, 1953
1,039,478    France                May 13, 1953

UNITED STATES PATENT OFFICE
CERTIFICATE OF CORRECTION

Patent No. 2,891,653 June 23, 1959

Julius Herrmann

It is hereby certified that error appears in the printed specification of the above numbered patent requiring correction and that the said Letters Patent should read as corrected below.

Column 4, line 18, for "discharge tray." read -- shovel. --.

Signed and sealed this 19th day of April 1960.

(SEAL)
Attest:

KARL H. AXLINE
Attesting Officer

ROBERT C. WATSON
Commissioner of Patents